United States Patent
Kaufman et al.

(10) Patent No.: US 7,105,776 B2
(45) Date of Patent: Sep. 12, 2006

(54) METHOD AND APPARATUS FOR WELDING WITH START CONTROL

(75) Inventors: Charles L. Kaufman, Neenah, WI (US); Michael T. Klegin, Greenville, WI (US)

(73) Assignee: Illinois Tool Works Inc, Glenview, IL (US)

( * ) Notice: Subject to any disclaimer, the term of this patent is extended or adjusted under 35 U.S.C. 154(b) by 277 days.

(21) Appl. No.: 10/764,250

(22) Filed: Jan. 22, 2004

(65) Prior Publication Data
US 2005/0161447 A1 Jul. 28, 2005

(51) Int. Cl.
*B23K 9/12* (2006.01)

(52) U.S. Cl. .................................. 219/137.71

(58) Field of Classification Search ........... 219/130.21, 219/130.31, 130.32, 130.33, 137.71, 60 A
See application file for complete search history.

(56) References Cited

U.S. PATENT DOCUMENTS

| | | | | |
|---|---|---|---|---|
| 3,536,879 A | * | 10/1970 | Sirois et al. ............... | 219/60 A |
| 3,546,423 A | * | 12/1970 | Scholz et al. ........... | 219/137.71 |
| 4,079,231 A | * | 3/1978 | Toth ....................... | 219/137.71 |
| 4,201,906 A | * | 5/1980 | Puschner ................ | 219/130.33 |
| 4,247,751 A | * | 1/1981 | Ashton et al. .......... | 219/137.71 |
| 5,168,144 A | * | 12/1992 | Hongu et al. ........... | 219/137.71 |
| 6,107,602 A | | 8/2000 | Geissler et al. | |

OTHER PUBLICATIONS

Miller S64M™ May 2001.
Miller XMT304 Dec. 2002.
MM251® Apr. 2003.
Miller Axcess® Apr. 2003.

* cited by examiner

*Primary Examiner*—Clifford C. Shaw
(74) *Attorney, Agent, or Firm*—George R. Corrigan

(57) ABSTRACT

A method and apparatus for providing welding power with a start control is disclosed. The welding power supply includes a source of welding power, a wire feeder and a controller. The source of welding power has at least one power control input, and provides welding power to an arc. The wire feeder has a feeder control input, and provides wire to the arc. The controller has a wire feed control output connected to the feeder control input, and a power source control output connected to the power control input. The controller also has a wire feed delay module, having as an input a user trigger signal, and having as an output the wire feed control output and the power source control output.

27 Claims, 1 Drawing Sheet

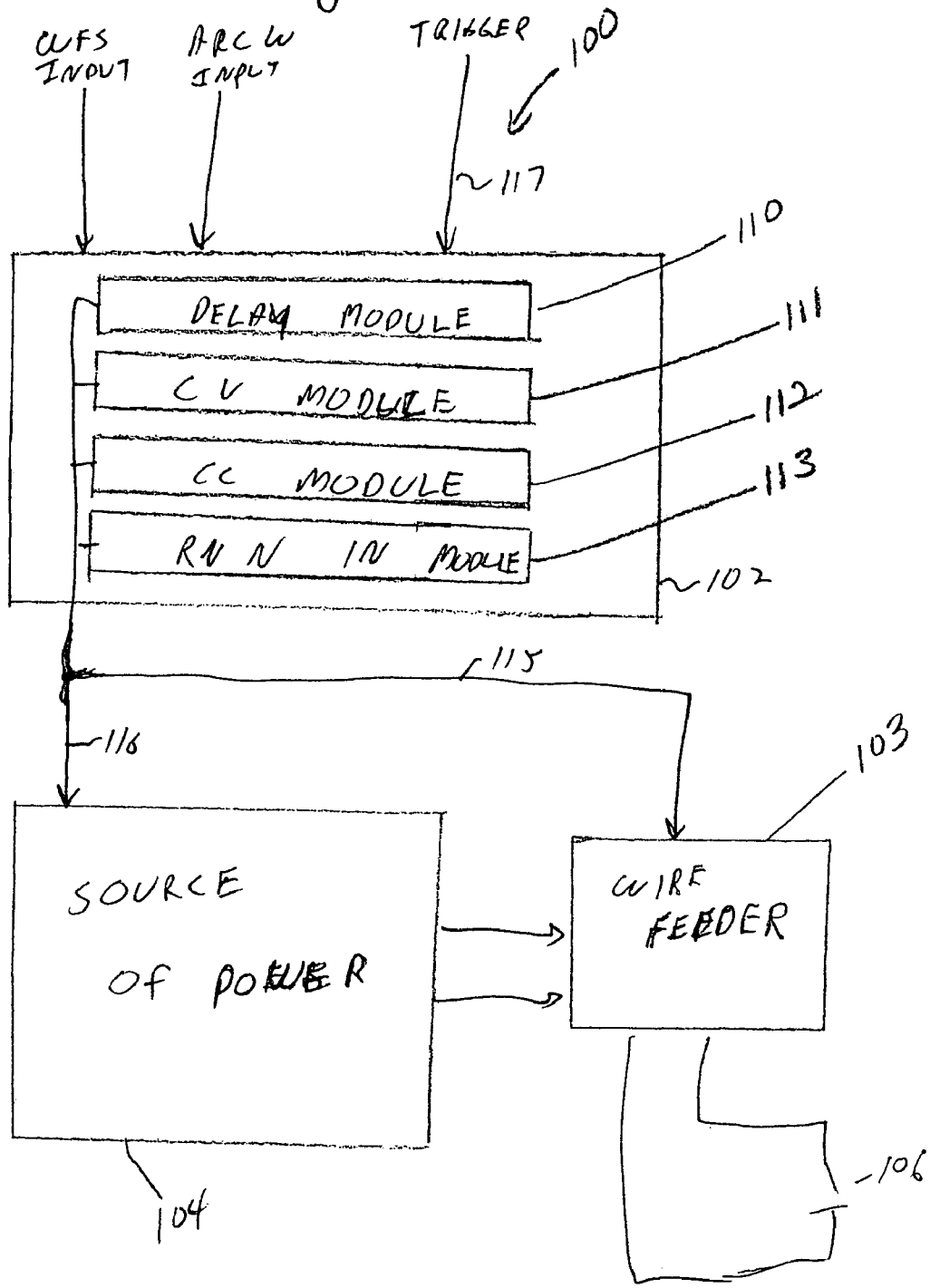

METHOD AND APPARATUS FOR WELDING WITH START CONTROL

FIELD OF THE INVENTION

The present invention relates generally to the art of providing welding power. More specifically, it relates to providing welding power with a controlled start.

BACKGROUND OF THE INVENTION

Electric arc welding is well known, and is performed with a variety of processes using a variety of types of equipment. One electric arc welding process is a pulse spray process, which is typically performed using a wire feeder and a power supply. An example of a prior art power supply used in pulse spray welding is a Miller S64M™ wire feeder. The Miller S64M™ wire feeder may be used with a Miller XMT304™ power supply.

Typically, a pulse spray welding power supply includes a wire feeder, a power source, and a controller, which may be disposed in the same or separate housings. Power is provided from the power source to the wire feeder, and the wire feeder provides the wire and power to the arc. The wire feeder typically includes a controller, which may be part of or separate from the wire feeder, and which controls the wire feed speed based on at least one user-selected input. Additionally, the controller provides a command signal to the power supply which causes the power supply to output a current and voltage at a desired magnitude. The command is produced in response to a user-selected wire feed speed. The power supply provides a specified current by adjusting the output voltage until the desired current is obtained. The current amplitude is often controlled as a function of time, switching between a background current and a peak current, thus creating a pulsed output.

Many prior art systems start a welding process by providing a run-in time, during which wire is fed to the arc at a run-in speed. This allows the wire to move to the work piece. Then, after the run-in ends, the wire is fed at the user selected rate. The run-in may be terminated when the wire reaches the workpiece, or when the arc starts. However, at times the user touches the wire to the workpiece before starting the welding process (by pulling the trigger on the torch). This can cause difficult starts.

Accordingly, it is desirable that a welding power supply and wire feeder include a controller that helps start the weld properly, particularly when the wire is touching the workpiece.

SUMMARY OF THE PRESENT INVENTION

According to a first aspect of the invention a welding power supply having a start control includes, a source of welding power, a wire feeder and a controller. The source of welding power has at least one power control input, and provides welding power to an arc. The wire feeder has a feeder control input, and provides wire to the arc. The controller has a wire feed control output connected to the feeder control input, and a power source control output connected to the power control input. The controller also has a wire feed delay module, having as an input a user trigger signal, and having as an output the wire feed control output and the source of power control output.

The welding wire feed delay module provides a wire feed delay of 20 milliseconds, or in response to output feedback. The welding power is provided to the arc through the wire feeder in another alternative.

The controller includes one or more of a pulse module, a CC module, a CV module, and a run-in module in various alternatives. They may operate sequentially, after the delay, in the order above, or in another order.

Other principal features and advantages of the invention will become apparent to those skilled in the art upon review of the following drawings, the detailed description and the appended claims.

BRIEF DESCRIPTION OF THE DRAWINGS

FIG. 1 is block diagram of a welding system in accordance with the preferred embodiment of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system and method, it should be understood at the outset that the invention may be implemented with other systems and methods.

Generally, the invention provides for starting the welding process in such a way as to avoid difficult starts, particularly when the wire is touching the workpiece when the user pulls the trigger. More specifically, the invention provides for sensing the pulling of the trigger, and in response thereto providing welding power, while delaying the start of wire feeding. The delay is approximately 20 milliseconds in the preferred embodiment, although other delays are used in other embodiments. The welding power is provided at the user set power in one embodiment, although other power levels, such as maximum power, a variable power, or a predetermined power, are provided in various alternatives.

If the wire is touching the workpiece, because the user positioned it incorrectly, or for some other reason, a short circuit will exist, and the output power will cause the tip of the wire to melt, creating an arc. If the wire is not touching the workpiece, there will be an open circuit, and current will not flow until the wire touches the workpiece, or an arc is formed. Thus, the art should start properly even when the wire is touching the workpiece.

The preferred embodiment uses a wire feeder design similar to the Miller S64M™ and a power supply design similar to the Miller XMT304™ power supply, but packaged in a single housing, or a MM251®, or such as that described in U.S. Pat. No. 6,107,602. The preferred wire feeder includes a digital controller, which includes a microprocessor and an EPROM memory. The controller, as described above, sets welding parameters according to factory set, or user-set, programs. Alternative embodiments provide that the controller is part of the power supply, or in a separate housing.

After the delay has ended, the controller causes wire to be fed at the user set rate. Other embodiments provide for wire to be fed at a run-in rate after the delay has ended.

The invention contemplates that, during (or after) the delay, either the user set power or power determined by another starting routine will be provided. In the preferred embodiment a starting routine such as that available on the Miller Axcess® power supply is provided. Generally, that routine provides for starting the pulse welding process by providing a constant current (CC) type power output to initiate the arc, followed by a constant voltage (CV) type power to maintain the arc, and then transitioning to a pulse type power to perform the pulse process.

The welding output is commanded to a CC output one millisecond after the start of the delay in the preferred embodiment. Preferably, the commanded level is high, such as about 600 amps. Then, after a millisecond of CC output, the output is commanded to a CV output for a time dependent on the welding program selected. Other parameters may be used to terminate the CV phase. Following the CV phase the output is changed to the user selected power, such as pulse, or MIG.

Another alternative provides for different time periods, different outputs, and ending the delay period upon sensing an open circuit (such as by using output voltage, current, or functions thereof), or in response to another fedback parameter. Delay, as used herein, is not limited to a period ending after a determined time, but may be a length of time determined by other parameters.

Referring now to FIG. 1, a welding system or power supply 100 in accordance with the preferred embodiment includes a controller 102, a wire feeder 103 and a power source 104, that cooperate to weld at an arc 106. Welding power supply, as used herein, includes any system capable of supplying welding power including resonant power supplies, quasi-resonant power supplies, etc., as well as control circuitry and other ancillary circuitry associated therewith. Controller, as used herein, includes digital and analog circuitry, discrete or integrated circuitry, DSPs, microprocessors, etc., and software, hardware and firmware, located on one or more boards, used to control a device such as a power supply. Power source, or source of power, as used herein, includes the power circuitry such as rectifiers, switches, transformers, SCRs, etc. that process and provide the output power. Arc, as used herein refers to the tip of the wire, the electrode, and any gap therebetween, and includes shorts, and includes open circuits.

Controller 102 includes a plurality of modules that perform various functions. The modules provide control signals, such as a wire feed control output 115 to a feeder control input and a power source control output 116 to a power source control input. Module, as used herein, includes software and/or hardware that cooperates to perform one or more tasks, and can include digital commands, control circuitry, power circuitry, networking hardware, etc.

The preferred embodiment includes a wire feed delay module 110, that operates in response to sensing a user trigger on 117. After the delay, a CV control module 111 provides a CV control output (i.e., control signals used for CV welding). After the CV control ends a CC control module 112 provides a CC control output. After the CC control ends, a pulse module 112 provides a pulse control output. A run-in control module operates before the CV control module, but after the delay, in alternative embodiments.

Numerous modifications may be made to the present invention which still fall within the intended scope hereof. Thus, it should be apparent that there has been provided in accordance with the present invention a method and apparatus for in welding power supply with a controlled start that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A welding power supply having a start control, comprising:
   a source of welding power, having at least one power control input, and disposed to provide welding power to an arc;
   a wire feeder, having a feeder control input, and disposed to supply wire to the arc; and
   a controller, having a wire feed control output connected to the feeder control input, and further having a power source control output, connected to the power control input, and further having a wire feed delay module, having as an input a user trigger signal, and having as an output the wire feed control output and the power source control output.

2. The welding power supply of claim 1, wherein the wire feed delay module provides a wire feed delay of 20 milliseconds.

3. The welding power supply of claim 1, wherein the welding power is provided to the arc through the wire feeder.

4. The welding power supply of claim 1, wherein the controller further includes a pulse module, which provides the wire feed speed output and the power control output for MIG welding, after the start of the operation of the wire feed delay module.

5. The welding power supply of claim 4, wherein the controller further includes a run-in module, which provides the wire feed speed output and the power control output after the start of the operation of the delay module, and before the operation of the pulse module.

6. The welding power supply of claim 1, wherein the controller further includes a pulse module, which provides the wire feed speed output and the power control output for pulse welding, after the start of the operation of the wire feed delay module.

7. The welding power supply of claim 6, wherein the controller further includes a CC module, which provides the wire feed speed output and the power control output, after the start of the operation of the wire feed delay module, and before the operation of the pulse module.

8. The welding power supply of claim 7, wherein the controller further includes a CV module, which provides the wire feed speed output and the power control output after the operation of the CC module, and before the operation of the pulse module.

9. The welding power supply of claim 1, wherein the wire feed delay module includes a feedback circuit input indicative of the presence or absence of an output open circuit, and terminate the operation of the wire feed delay module in response to an open circuit.

10. A welding power supply having a start control, comprising:
    means for providing welding power to an arc in response to at least one power control input;
    means for feeding wire to the arc in response to a feeder control input; and means for controlling the means for feeding wire and the means for providing power, connected to the feeder control input and the power control input, and having a means for delaying the feeding of wire and providing output power in response to a user trigger signal.

11. The welding power supply of claim 10, wherein the delay module provides a delay of 20 milliseconds.

12. The welding power supply of claim 11, wherein the means for delaying includes means for terminating the operation of the means for delaying in response to an open circuit.

13. The welding power supply of claim 10, wherein the welding power is provided to the arc through the means for feeding.

14. The welding power supply of claim 13, wherein the means for controlling further includes a means for providing MIG control after the start of the operation of the means for delaying.

15. The welding power supply of claim 13, wherein the means for controlling further includes a means for providing pulse control after the start of the operation of the means for delaying.

16. The welding power supply of claim 15, wherein the means for controlling further includes a means for providing CC control after the start of the operation of the means for delaying, and before the operation of the means for providing pulse control.

17. The welding power supply of claim 16, wherein the means for controlling further includes a means for providing CV control after the operation of the means for providing CC control, and before the operation of the means for providing pulse control.

18. The welding power supply of claim 17, wherein the means for controlling further includes a means for providing run-in control after the start of the operation of the means for delaying, and before the operation of the means for providing pulse control.

19. A method of providing welding power with a start control, comprising:
sensing a user trigger signal indicating a desire to start the welding process;
upon the sensing, delaying feeding wire to an arc;
upon the sensing providing power to the arc; and
after delaying, feeding wire to the arc.

20. The method of claim 19, wherein the delay is 20 milliseconds.

21. The method claim 19, wherein the welding power is provided to the arc through the wire feeder.

22. The method of claim 19, including providing pulse power after the start of the delay.

23. The method of claim 22, further providing CC power after the start of the delay and before providing pulse power.

24. The method of claim 23, further providing CV power after providing CC power and before providing pulse power.

25. The method of claim 22, further comprising feeding wire at a run in speed after the start of the delay and before providing pulse power.

26. The method of claim 19, wherein the delay is terminated when an open circuit at the arc is sensed.

27. The method of claim 19, including providing MIG power after the start of the delay.

* * * * *